H. & O. AMUNDSEN.
Device for Feeding Steam Boilers.
No. 9,459.
Reissued Nov. 9, 1880.
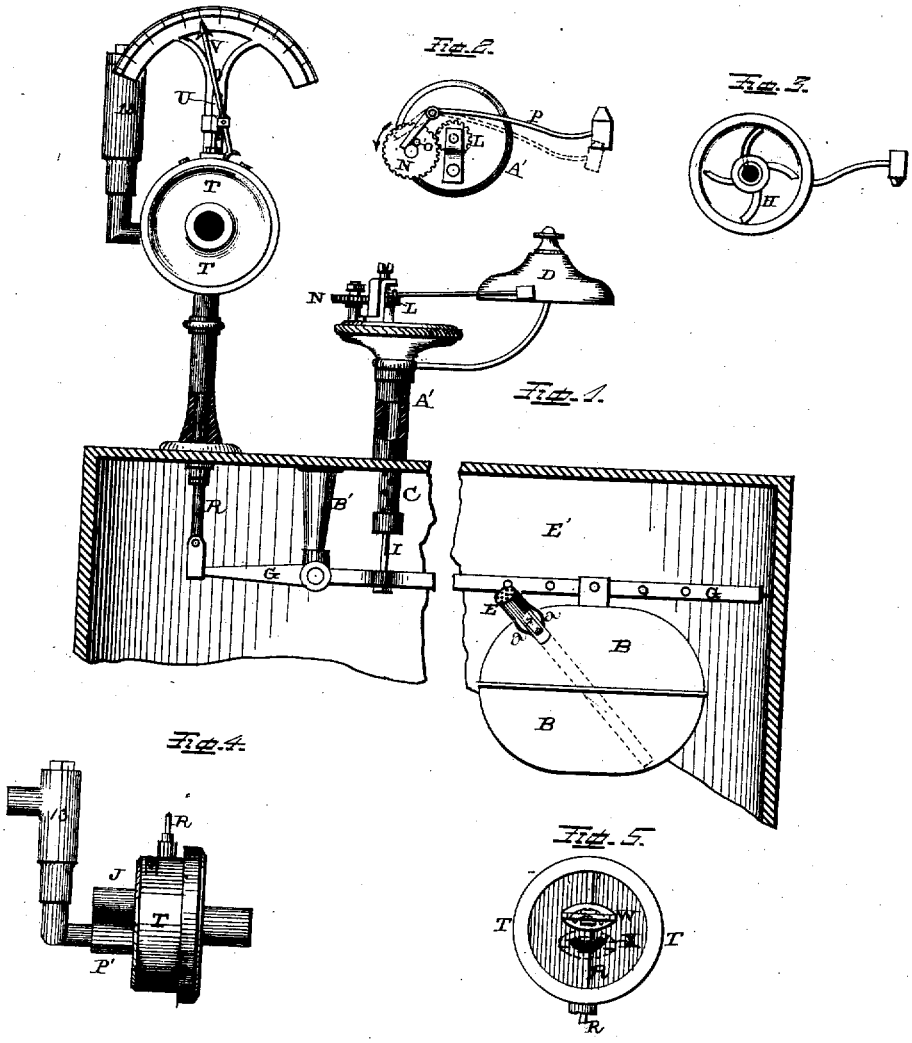
Witnesses
Wm. W. Mortimer,
Chas. H. Isham
Inventors,
Hans Amundsen,
Ole Amundsen,
per
F. A. Lehmann,
Atty
N. PETERS, PHOTO-LITHOGRAPHER, WASHINGTON, D. C.

UNITED STATES PATENT OFFICE.

HANS AMÜNDSEN AND OLE AMÜNDSEN, OF LITTLE FALLS, WISCONSIN.

DEVICE FOR FEEDING STEAM-BOILERS.

SPECIFICATION forming part of Reissued Letters Patent No. 9,459, dated November 9, 1880.

Original No. 227,145, dated May 4, 1880. Application for reissue filed September 7, 1880.

*To all whom it may concern:*

Be it known that we, HANS AMÜNDSEN and OLE AMÜNDSEN, of Little Falls, in the county of Polk and State of Wisconsin, have invented certain new and useful Improvements in Devices for Feeding Steam-Boilers; and we do hereby declare that the following is a full, clear, and exact description of the invention, that will enable others skilled in the art to which it appertains to make and use the same, reference being had to the accompanying drawings, and to the letters of reference marked thereon, which form a part of this specification.

Our invention relates to an improvement in low-water indicators for steam-boilers; and it consists in the combination of a perforated pipe having a valve placed in its lower end with a revolving wheel which operates an alarm mechanism, so as to give alarm when the water is low.

It further consists in a float having a pipe extending down to, or nearly down to, its bottom, so that as soon as water accumulates in the float the heat will expand the air in the upper part of the float to such an extent that the water will be forced out through the pipe, and thus the float is always made self-cleaning and prevented from filling with water to such an extent as to no longer be accurate in its action.

It also consists in attaching to the rod which operates the low-water indicator a valve for controlling the inlet of water, whereby the rod is made to perform a double function, as will be more fully described hereinafter.

Figure 1 is a side elevation of our invention, partly in section. Fig. 2 is a plan view of the alarm mechanism by itself. Fig. 3 is a longitudinal section of the same, showing the wheel. Figs. 4 and 5 are detail views of the low-water indicator and the connecting parts.

E′ represents a steam-boiler of any desired shape, size, or construction, and which has the hanger B′ projecting down from its top, and in the lower end of which hanger is pivoted the lever G, upon which the float B is placed. This float may be of any desired construction, and is adjustable back and forth upon the lever, according to the height to which it is desired the water in the boiler shall rise. Projecting from the top of this float is a short pipe, which has a strainer, E, placed upon its top. This strainer is provided with a number of springs, *a*, which, by catching against the sides of the pipe, hold the strainer in position, so that it can be readily removed and replaced. The lower end of this pipe extends down to or near the bottom of the float, so that when the float becomes heated by the steam and water the air in the upper part of the float becomes expanded, and, bearing down upon the water that has gotten into the float, forces it out through the upper end of the tube.

As is well known, floats that are made air-tight or have a hole made in them act very well for a time; but they soon become filled with water to such a degree that they sink and become useless. Having the pipe extending down to the bottom of the float, and thus causing the air to act as a cushion to force out the water as soon as it rises above the lower end of the pipe, the float will never fill and sink, as above described, but will always act as accurately as when first put in the boiler.

Passing down through the top of the boiler is a perforated pipe, A′, which has a valve placed in its lower end, and which valve is connected with the lever G by the rod I. Under this valve is placed a spring for the purpose of throwing the valve back into position again as soon as the lever leaves it free to move. In the top of the pipe A′, which is enlarged for the purpose, is placed a small turbine wheel, H, the shaft of which extends up through the enlarged part of the pipe A′, and has a pinion, L, secured to it. This pinion L meshes with the wheel N, which has a stud or projection, O, extending above its top for the purpose of operating the bell-lever P.

As soon as the water falls below a certain level the lever G draws the valve in the pipe A′ down below the top perforations, when the steam at once rushes up into the pipe and through the arms of the wheel H, causing the wheel to revolve and thereby communicate motion to the wheels L N, causing the bell-lever P to strike constantly against the bell D and give alarm and call attention to the fact that the water is below the safety-level.

To the short end of the lever G is connected the rod R, which passes up through the cylinder T, and has the rack U secured to its upper end. This rack U meshes with a small pinion on the same shaft as the indicator V, which shows the height of the water in the boiler. Through the rear side of this cylinder T is made an opening, X, and secured to the rod R is the valve W, which, when the rod R moves up and down, opens or closes the valve to admit or shut off the supply of water to the boiler. The feed-water is fed to the cylinder through pipe 13. From the pipe 13 it passes through the short pipe P′ into the cylinder T. In case there is sufficient water in the boiler and the valve W has closed the opening X, the water passes out through the pipe J back to the supply source.

By thus placing the valve W upon the rod R the rod is made to perform the double function of operating the indicator, which shows the height of the water in the boiler, and of operating the valve which controls the feed-water supply.

Having thus described our invention, we claim—

1. In a low-water indicator for boilers, a wheel, H, having hollow arms through which the steam escapes, and which, in revolving, operates the wheels L N and lever P, substantially as described.

2. In a low-water indicator for boilers, the combination of the lever G and float B with the rod R, provided with the valve W and rack U, whereby it is made to control both the indicator and the supply of feed-water, all constructed and arranged substantially as set forth.

3. A float for steam-boilers, provided with a tube which is open at its upper and lower ends, and has its lower end extending down to or near the bottom of the float, in combination with the removable strainer which is applied to the upper end of the pipe, and provided with the springs *a*, for holding it in position, substantially as set forth.

In testimony whereof we affix our signatures in presence of two witnesses.

HANS AMÜNDSEN.
OLE AMÜNDSEN.

Witnesses:
JOHN ANDERSON,
NILS OTTERSEN.